(12) United States Patent
Francis et al.

(10) Patent No.: US 9,651,136 B2
(45) Date of Patent: May 16, 2017

(54) TRANSFER CASE WITH ALUMINUM YOKE

(71) Applicant: BorgWarner Inc., Auburn Hills, MI (US)

(72) Inventors: Philip J. Francis, Lapeer, MI (US); Thomas Knox, Waterford, MI (US); Greg Bartman, Commerce, MI (US); Arun Narayanan, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/676,306

(22) Filed: Apr. 1, 2015

(65) Prior Publication Data
US 2016/0290474 A1 Oct. 6, 2016

(51) Int. Cl.
| | | |
|---|---|---|
| *F16H 57/025* | (2012.01) | |
| *F16H 57/02* | (2012.01) | |
| *B60K 17/344* | (2006.01) | |
| *B60K 17/346* | (2006.01) | |

(52) U.S. Cl.
CPC ........ *F16H 57/02* (2013.01); *B60K 17/344* (2013.01); *B60K 17/346* (2013.01); *F16H 57/025* (2013.01); *F16H 2057/02052* (2013.01); *F16H 2057/02091* (2013.01); *Y10T 74/2186* (2015.01); *Y10T 74/2188* (2015.01)

(58) Field of Classification Search
CPC ... F16H 2057/02052; F16H 2057/0216; F16H 2057/02091; F16H 57/032; F16H 57/021; F16H 57/02; F16D 3/845; F16D 3/84; F16D 3/846; B65D 7/10; B60K 17/344; B60K 17/346; B60K 5/1241; B60K 5/1225; B60K 5/1208; Y10T 74/2186; Y10T 74/2188; F16F 1/3849; F16F 1/38; F16F 1/387; F16F 1/3873; F16F 1/3876; F16F 1/3835; F16F 1/3842

See application file for complete search history.

(56) References Cited

U.S. PATENT DOCUMENTS

| | | | | |
|---|---|---|---|---|
| 3,243,240 | A * | 3/1966 | Arthur ..................... | B60G 7/00 174/153 G |
| 4,108,021 | A * | 8/1978 | MacAfee ........... | B60K 17/3467 475/203 |
| 4,373,602 | A * | 2/1983 | Tomita ..................... | B62M 7/04 180/227 |
| 4,449,603 | A * | 5/1984 | Langwieder ............. | B60K 5/04 180/232 |
| 4,485,999 | A * | 12/1984 | Isobe ................... | B60K 5/1208 248/659 |

(Continued)

*Primary Examiner* — Daniel Yabut
(74) *Attorney, Agent, or Firm* — Warn Partners, P.C.

(57) ABSTRACT

A transfer case for a normally rear wheel drive vehicle having selectively engageable front wheel drive is provided. The transfer case includes a rear housing with a main drive shaft aperture and an aluminum cast front housing threadably connected with the rear housing. The front housing has a main drive shaft aperture axially aligned with the rear housing main drive shaft aperture. The front housing has an integrally formed cylindrical yoke forming an isolation mount for receiving a polymeric isolator allowing for connection of the transfer case with a chassis structure of the vehicle. The cylindrical yoke has a cylindrical preform therein.

2 Claims, 4 Drawing Sheets

(56) References Cited

U.S. PATENT DOCUMENTS

| | | | | |
|---|---|---|---|---|
| 4,492,189 A * | 1/1985 | Ogawa | F02F 7/006 | 123/195 C |
| 4,986,073 A * | 1/1991 | Okada | B60K 17/105 | 60/454 |
| 5,035,397 A * | 7/1991 | Yamada | B60K 5/1216 | 180/297 |
| 5,129,479 A * | 7/1992 | Fujii | B60K 5/1216 | 180/297 |
| 5,156,576 A * | 10/1992 | Johnson | B60K 17/105 | 475/206 |
| 5,273,131 A * | 12/1993 | Uchiyama | B60K 5/1216 | 180/291 |
| 5,287,769 A * | 2/1994 | von Kaler | B60K 17/08 | 74/371 |
| 5,435,516 A * | 7/1995 | Ogasawara | F16F 1/3849 | 248/635 |
| 5,718,407 A * | 2/1998 | Lee | F16F 1/3842 | 180/312 |
| 6,209,673 B1 * | 4/2001 | Barlage | B60K 17/00 | 180/245 |
| 6,254,706 B1 * | 7/2001 | Ozawa | F16F 1/387 | 156/272.8 |
| 6,435,556 B1 * | 8/2002 | Takagi | B60G 7/02 | 180/299 |
| 6,540,042 B2 * | 4/2003 | Hamaekers | B60K 5/1225 | 180/297 |
| 8,042,793 B2 * | 10/2011 | Igami | B60K 5/1216 | 180/297 |
| 2004/0262460 A1 * | 12/2004 | Molnar | B60K 13/04 | 248/60 |
| 2005/0002731 A1 * | 1/2005 | Beer | F01M 11/0004 | 403/294 |
| 2006/0144631 A1 * | 7/2006 | Kim | B60K 5/1216 | 180/299 |
| 2007/0272051 A1 * | 11/2007 | Kamei | B60G 7/001 | 74/579 R |
| 2010/0183848 A1 * | 7/2010 | Krause | B29C 45/14778 | 428/167 |
| 2013/0190114 A1 * | 7/2013 | Neumeister | F16H 57/0409 | 474/93 |
| 2014/0073471 A1 * | 3/2014 | Whyte | F16H 57/031 | 475/220 |

* cited by examiner

TRANSFER CASE WITH ALUMINUM YOKE

FIELD OF THE INVENTION

The present invention relates to transfer cases for automotive vehicles. In particular, the field of the present invention is for transfer cases in vehicles having longitudinally mounted engines and normally rear wheel drive with selective on demand four wheel drive capabilities.

BACKGROUND OF THE INVENTION

Rear wheel drive vehicles which are selectively engageable to be four wheel drive vehicles have a transfer case. The transfer case typically has a primary shaft which is connected to the output of a vehicle transmission. The primary shaft typically rotatably mounts a sprocket that engages a chain. The chain typically engages with another sprocket that is typically connected with a secondary shaft. The secondary shaft is rotatably mounted within the transfer case. The secondary shaft is torsionally connected with a front drive shaft that is torsionally connected with a front differential to power front wheels of the vehicle. To provide a function of selectively engaging the front wheels of the vehicle, there is provided a clutch mechanism that selectively engages the sprocket on the primary shaft with the primary shaft to transfer torque from the primary shaft to the secondary shaft thereby selectively engaging the front wheels of the vehicle. When ideal pavement conditions exist, typically the clutch not be engaged so that the transmission only torsionally engages the rear wheels of the vehicle. A controller is typically provided which is cognizant of wheel slip conditions to automatically control the engagement of the clutch. In some four wheel drive embodiments, the clutch can also be engaged as a result of operator demand.

Most transfer cases in normally rear wheel drive vehicles with longitudinally mounted engines have a portion of the transfer case housing connected to a rear of the transmission housing. Typically the transfer case housing also has a yoke. The yoke typically has a polymeric isolator inserted therein that is fastener connected to a crossbar member of the vehicle chassis. To meet fuel economy standards in the last 3 decades there's been a constant quest to reduce vehicle weight. Accordingly most transfer case housings are fabricated from aluminum. For a cost standpoint, most housing are fabricated using a casting process. However in a vehicle crash situation is desirable for the transfer case to be resistant as possible to deformation so that the vehicle's drivetrain is functional after a crash. It is desirable to retain the use of aluminum transfer case housing, while at the same time providing a transfer case housing having enhancement strength capabilities in automotive crash situations.

SUMMARY OF THE INVENTION

To make manifest the above noted desire, a revelation of the present invention is brought forth. In an example of a preferred embodiment, the present invention provides a freedom of a transfer case fabricated from cast aluminum with enhanced strength characteristics in a vehicle crash situation. The inventive transfer has in a yoke with a strategically placed preform having a tensile strength significantly greater than that of cast aluminum. Typical materials will be steel or titanium. Because of the preform, the strength of the yoke is greatly enhanced thereby allowing the yoke of the transfer case to be far more resistant to deformation in a crash situation allowing increase strength while at the same time maintaining the environmental advantages of lighter weight provided by the cast aluminum.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

Figure 1:
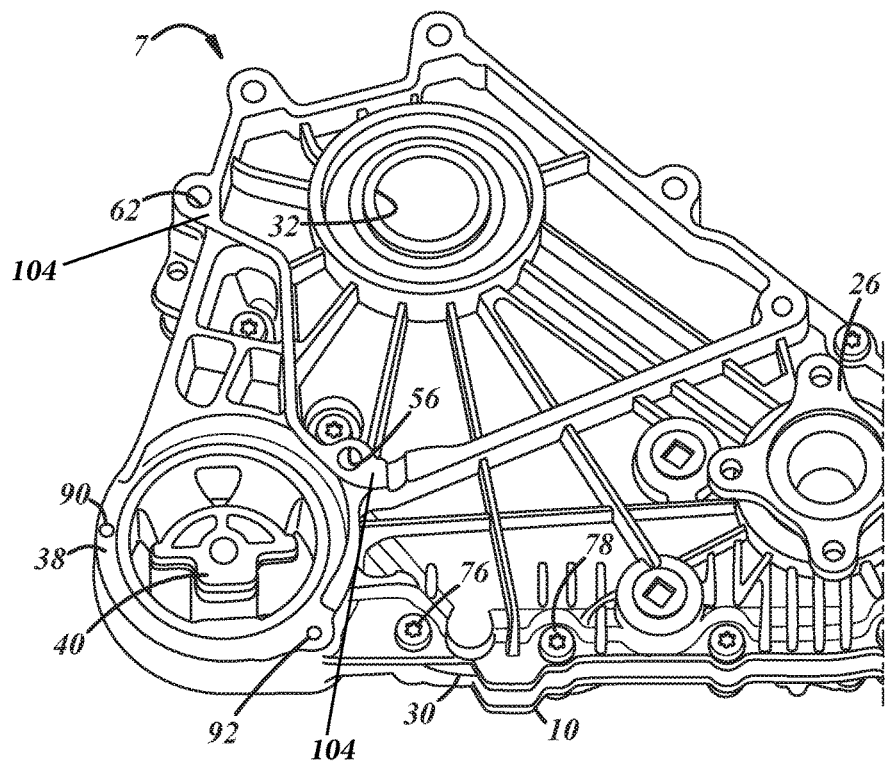
FIG. 1 is a perspective of a preferred embodiment transfer case according to the present invention.
Figure 2:
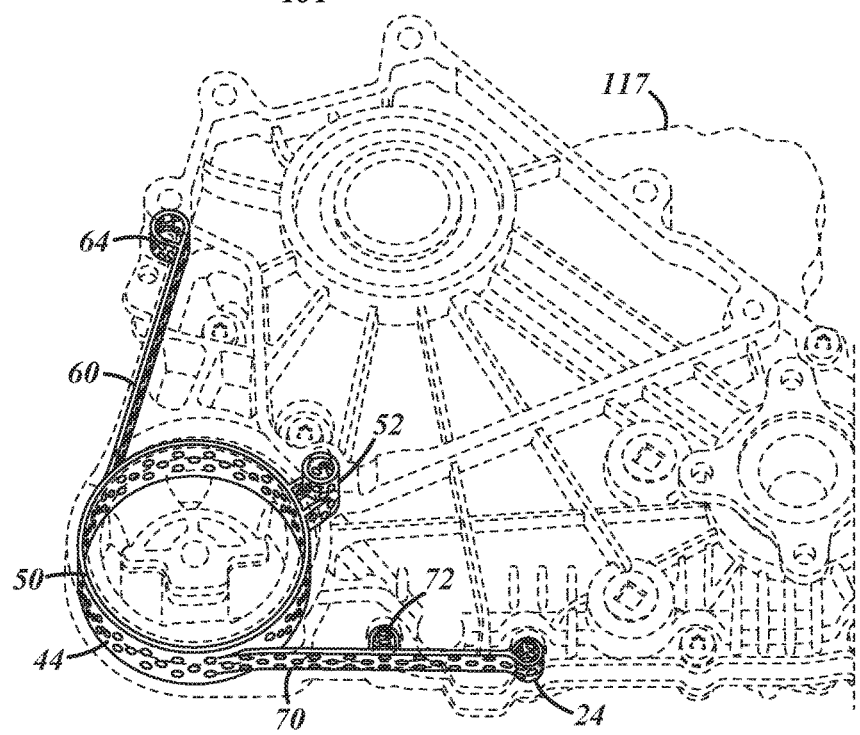
FIG. 2 is a view similar to that of FIG. 1 illustrating the preform within a yoke of the transfer case shown.
Figure 3:
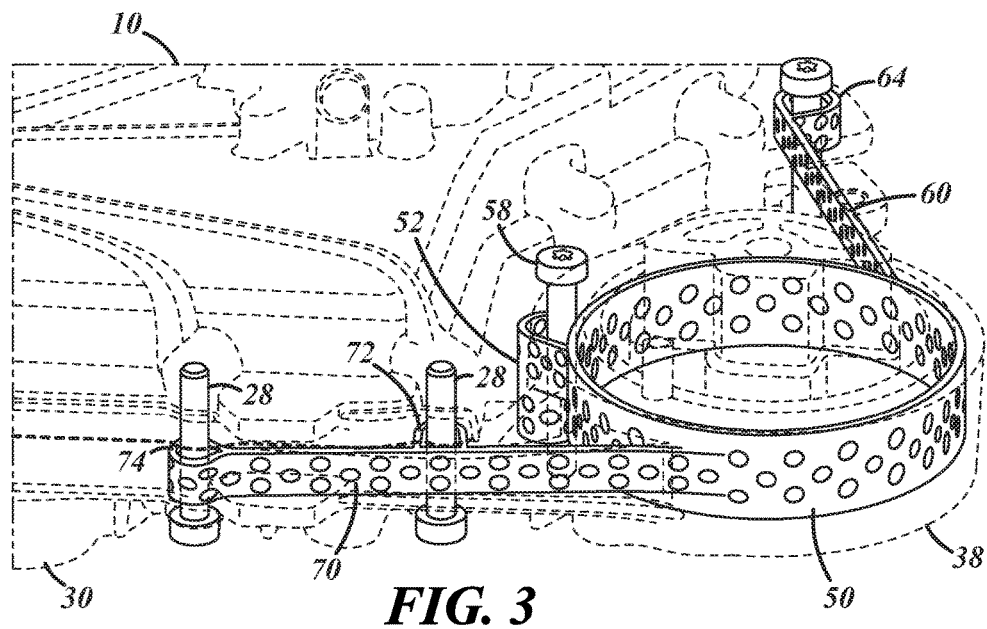
FIG. 3 is an enlarged view similar to that of FIG. 2 looking at the transfer case from a rear direction.
Figure 4:
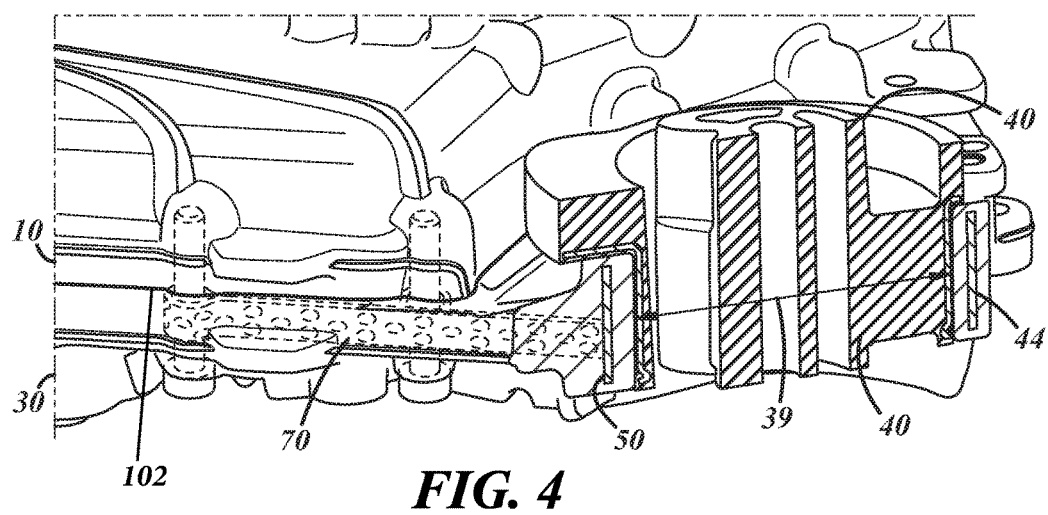
FIG. 4 is a perspective partially sectioned view of a portion of the transfer case shown in FIG. 3.
Figure 5:
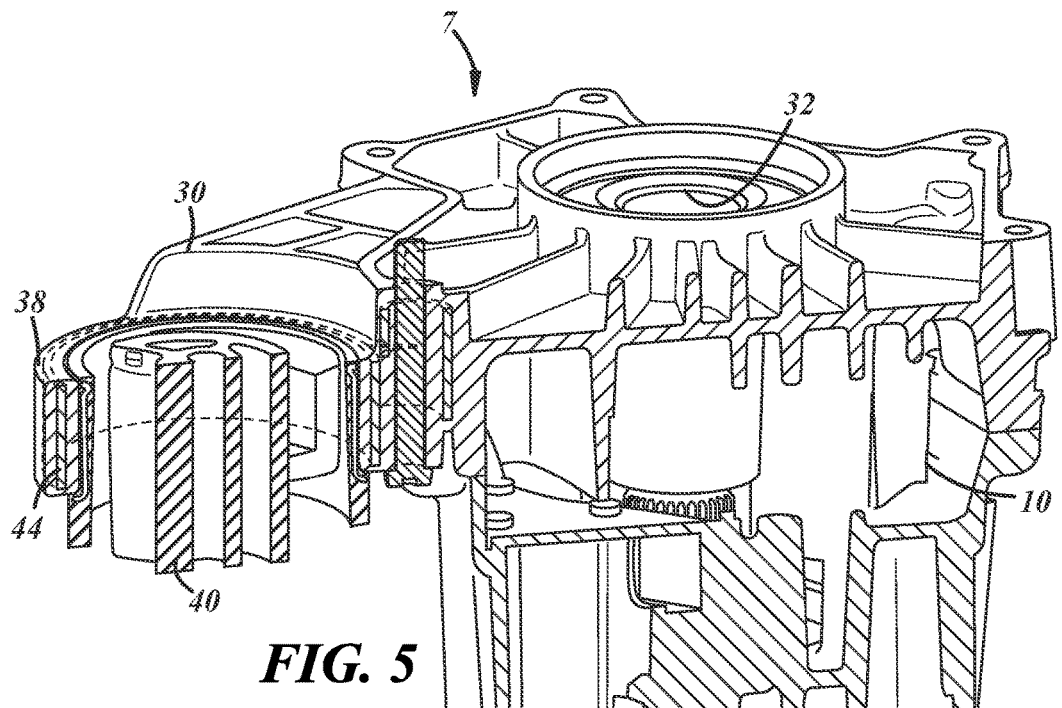
FIG. 5 is a side perspective sectioned view of the transfer case shown in FIG. 1.
Figure 6:
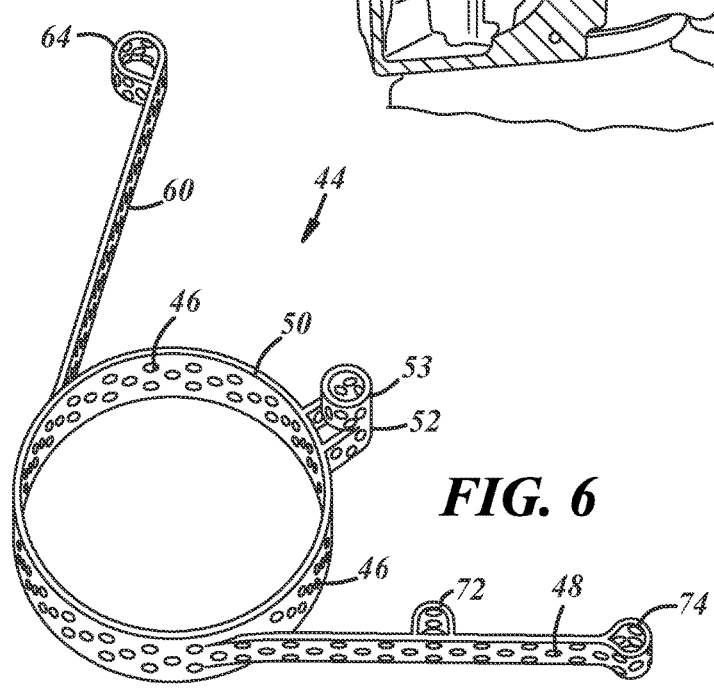
FIG. 6 is a perspective view of the preform shown in FIG. 2.
Figure 7:
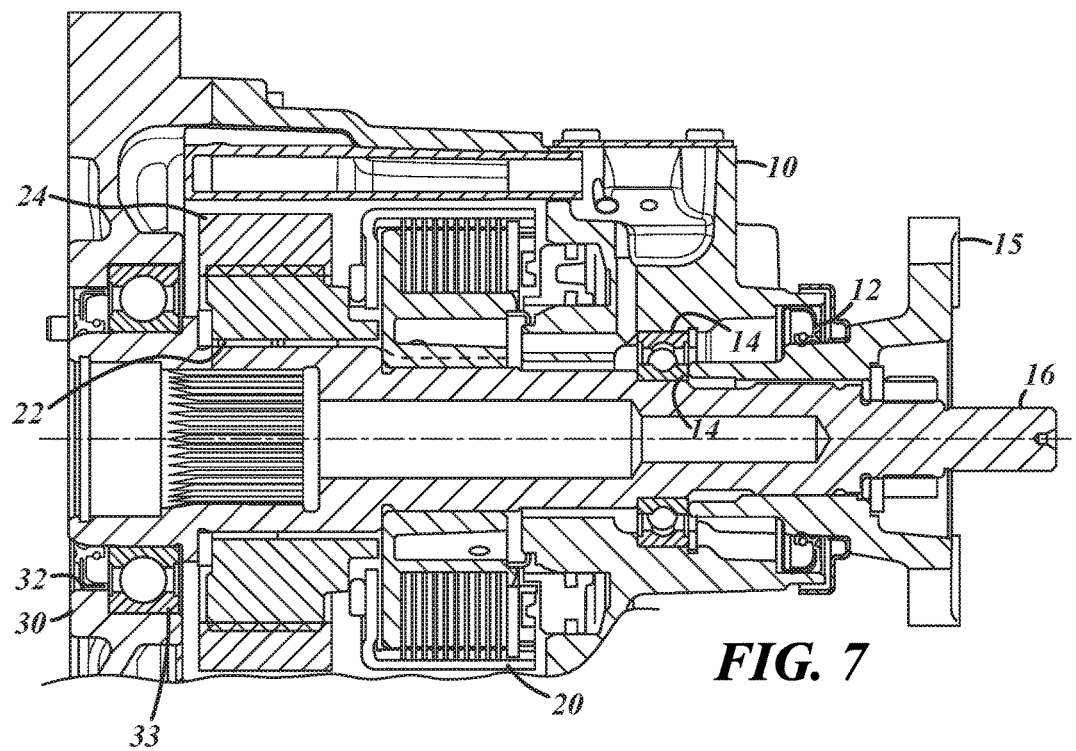
FIG. 7 is a partial side sectional view of the transfer case shown in FIG. 1.
Figure 8:
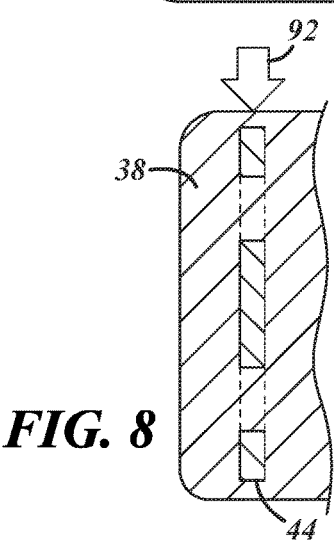
FIG. 8 is a partial enlarged sectional view showing a line of force going through the yoke and a cylindrical portion of the preform shown in FIG. 2.

Referring to FIGS. 1 through 7 a transfer case 7 according to the present invention is provided. The transfer case 7 is for a normally rear wheel drive vehicle having selectively engageable four wheel drive capabilities. Transfer case 7 has a rear housing 10. The rear housing 10 has a main drive shaft aperture 12. Positioned within the rear housing main drive aperture 12 is a bearing 14 that supports a main drive shaft 16. The main drive shaft receives a torsional input along its front end from a vehicle's transmission output shaft (not shown).

The main drive shaft 16 via a clutch 20, sprocket 22 and chain 24 drives a front wheel output shaft (not shown). The main drive shaft 16 is connected with a rear output yoke 15. The front output shaft is torsionally unitary with a yoke 26. Typically, the rear housing 10 is formed as an aluminum casting utilizing standard automotive aluminum material. Axially clamp connected to the rear housing 10 along a mating clamping interface 102 by a series of threaded connectors such as bolts 28 is a front housing 30. The front housing 30 is formed as an aluminum casting utilizing standard automotive aluminum material. The front housing 30 has a main drive shaft aperture 32. The front housing main driveshaft aperture 32 is axially aligned with the rear housing main drive shaft aperture 12. The front housing mounts a bearing 33 that supports the main drive shaft 16. The front housing 30 has a front axle output shaft aperture. To facilitate connection of the transfer case 7 with a chassis of the vehicle (not shown) the front housing 30 has an integrally formed cylindrical yoke 38. The yoke 38 forms an isolation mount for receiving a polymeric isolator 40. The yoke 38 extends outside of the clamping interface 102. The yoke has an inner diameter 39.

The yoke 38 during formation has a steel or titanium preform 44. Preform 44 may be fabricated from other suitable materials that have a modulus of elasticity substantially greater than that of aluminum ($10 \times 10^6$ pounds force per square inch) and which can be utilized in an aluminum casting. Preform 44 is a cylindrical typically 1 mm thick material. The preform 44 has perforations 46 to allow the flow through of aluminum during formation (during the die-casting process) of the front housing 30. The preform has a cylindrical main body 50. Fixably connected to the main body 50 preferably by welding or other fusion method is a transmission connection sub-preform 52. Sub-preform 52 surrounds bolt hole 56. Bolt hole 56 is relatively smaller than an inner diameter of yoke 38. Bolt hole 56 receives a bolt 58. The head of the bolt 58 abuts a rear side of the front housing 30 when the transfer case 7 is axially clamp connected assembled to a transmission housing along a clamping interface 104. The yoke 38 extends outside of the clamping interface 104. Sub-preform 52 has a portion 53 axially extending forward toward the transmission housing beyond the main cylindrical body 50 of the preform 44. Portion 53 resides within the outer wall of the aluminum casting of the front housing 30.

The transfer case 7 also has an optional fusion connected side extension sub-preform 60. Side extension sub-preform 60 has a portion 64 surrounding a bolt hole 62. Bolt hole 62 is relatively smaller than an inner diameter 39 of yoke 38. Bolt hole 62 accepts a bolt connecting the front housing with the transmission housing of the vehicle.

The transfer case 7 also has an optional fusion connected lower extension sub-preform 70. Lower extension sub-preform 70 has two portions 72 and 74 surrounding a bolt holes (covered by bolt heads 76 and 78). The bolt holes have a diameter relatively smaller than the inner diameter 39 of the yoke 38. Bolt holes (covered by the bolt heads 76 and 78) accept bolts 28 connecting the front housing 30 with the rear housing 10.

In a vehicle crash situation (primarily frontal crash) loading into the transfer case 7 from the vehicle chassis 113 is into load points 90 and 92. Load points 90 and 92 are axially aligned or centered with the preform 44. Because of the inventive design of the yoke 38 with the preform 44, deformation of the yoke is substantially resisted. According in most low-speed and high-speed crash situations wherein the engine and transmission 117 are still functional, the transfer case will not be rendered non-operational by deformation in yoke 38, the imputed load at load points 90 and 92 are now distributed across the entire preform 50 and its sub-preforms 60 and 70, as permitted by the actual design environment of the transfer case in the vehicle package.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transfer case for a normally rear wheel drive automotive vehicle having selectively engageable front wheel drive, said transfer case including:
   a rear housing with a main drive shaft aperture;
   a main drive shaft supported by said rear housing and connected with a rear output yoke;
   an aluminum cast front housing threadably connected along a mating clamping interface with said rear housing, said front housing also being threadably connected, said front housing having a main drive shaft aperture axially aligned with said rear housing main drive shaft aperture, said front housing supporting said main drive shaft, said front housing having a front axle output shaft aperture, said front housing having an integrally formed cylindrical yoke, said yoke forming an isolation mount for receiving a polymeric isolator for connection of said transfer case with a chassis structure of said vehicle, said cylindrical yoke having therein a main body accepting a main body cylindrical preform taken from a group of metals including steel and titanium at least 1 mm thick, said preform cylindrical main body being axially aligned with a load point between a chassis of the vehicle and said transfer case, and
   wherein said main body cylindrical preform has a fusion connected transmission connection sub-preform, said transmission connection sub-preform having a portion axially extending forward toward the transmission beyond said main body cylindrical preform, said transmission connection sub-preform has a portion surrounding a bolt hole utilized for axially clamped connection of said front housing along a mating clamping interface with the transmission of the vehicle, and said preform cylindrical main body having a fusion connected lower boundary extension sub-preform and a fusion connected side extension sub-preform, said lower boundary extension sub-preform having multiple portions surrounding bolt holes utilized in axially clamped connecting said front housing with said rear housing, said side extension sub-preform having a portion surrounding a bolt hole utilized in axially clamped connecting said front housing with the transmission of the vehicle and wherein all said bolt holes are at least relatively smaller than an inner diameter of said yoke, and wherein said yoke is outside of said clamping interface with the rear housing and said clamping interface with said transmission.

2. A transfer case as described in claim 1 wherein said preform material is perforated.

* * * * *

UNITED STATES PATENT AND TRADEMARK OFFICE
CERTIFICATE OF CORRECTION

PATENT NO. : 9,651,136 B2
APPLICATION NO. : 14/676306
DATED : May 16, 2017
INVENTOR(S) : Philip J. Francis et al.

Page 1 of 1

It is certified that error appears in the above-identified patent and that said Letters Patent is hereby corrected as shown below:

In the Specification

Column 1,
Line 30, insert -- will -- between "clutch" and "not"

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*